Sept. 10, 1963            R. S. WEIL            3,103,105
COOLING SYSTEM FOR ELECTRICAL AND ELECTRONIC
EQUIPMENT CABINETS
Filed Sept. 18, 1961
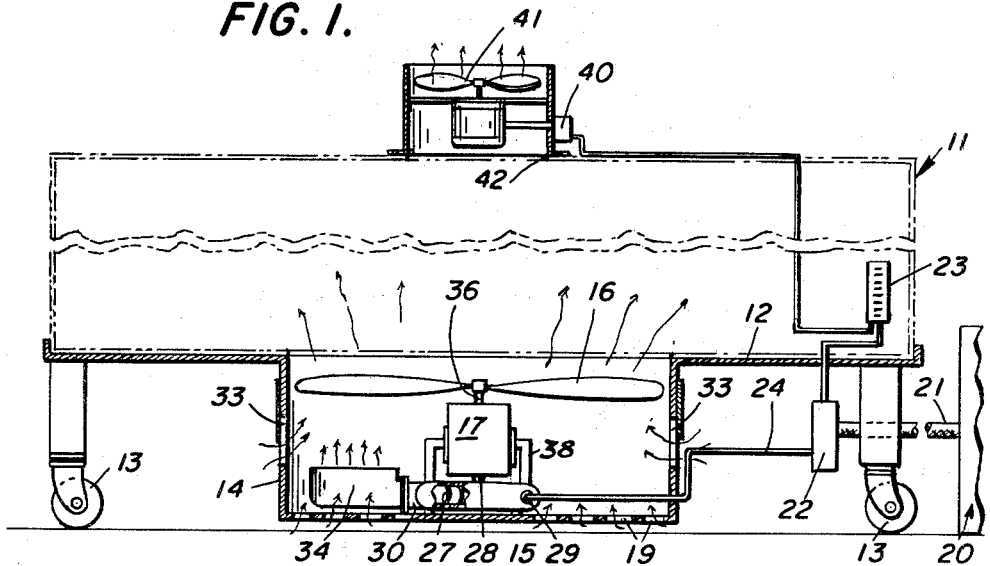
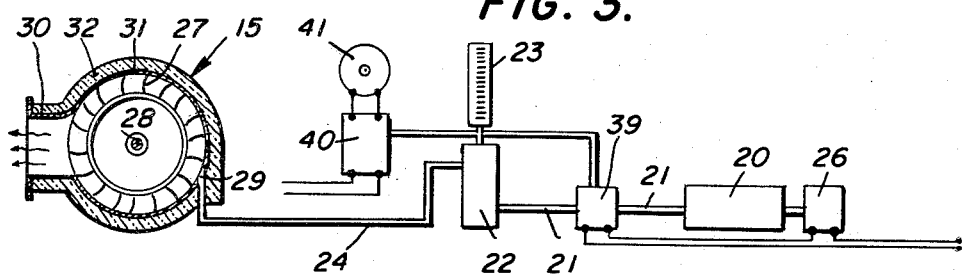
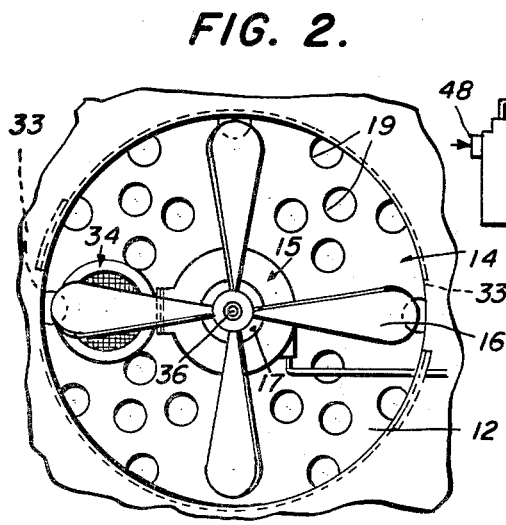
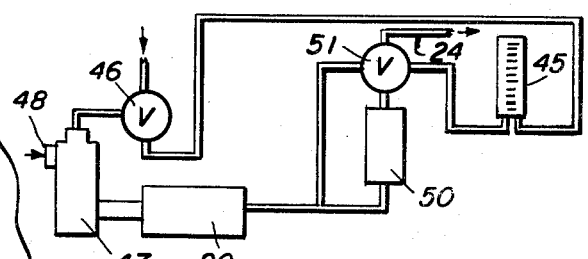
INVENTOR
ROBERT S. WEIL
BY
ATTORNEY 3,103,105
COOLING SYSTEM FOR ELECTRICAL AND
ELECTRONIC EQUIPMENT CABINETS
Robert S. Weil, Santa Monica, Calif., assignor to W. D.
Industries, Ltd., Beverly Hills, Calif., a corporation of
California
Filed Sept. 18, 1961, Ser. No. 138,842
6 Claims. (Cl. 62—172)

This invention relates to a cooling system for electrical and electronic equipment enclosed in cabinets.

Complex installations of electronic equipment such as computers and the like enclosed in cabinets frequently become overheated when in use. Because of the large sizes of some of these units or cabinets, the air conditioning systems (normally designed for personnel comfort cooling) of the buildings or rooms in which they are housed are insufficient to handle the extra heat load developed in the electrical and electronic equipment, and auxiliary cooling is essential.

The principal object of this invention is to provide an auxiliary cooling system for cabinets containing electronic equipment. Another object of the invention is to provide means for cooling and circulating air through electrical and electronic cabinets involving the addition of cooled fresh air expanded from a compressed air system. Another object is to provide means for cooling and humidifying the air circulated through electrical and electronic equipment cabinets by using expanded compressed fresh air as the cooling medium.

These and other objects are attained by my invention which will be understood from the following description, reference being made to the accompanying drawings in which FIG. 1 is a side elevational view partly in section showing a preferred form of my invention as applied to an electronic equipment cabinet;

FIG. 2 is a plan view of the same with the cabinet and exhaust fan omitted;

FIG. 3 is a diagram showing the temperature control means for the air cooler system; and FIG. 4 is a diagram of an auxiliary humidity control means.

In the drawings, particularly FIGS. 1 and 2, there is shown an electronic equipment cabinet 11 which is mounted on a platform 12, which may be provided with casters 13 to elevate the platform above the floor sufficiently to permit the provision of an air mixing chamber 14. The air mixing chamber has mounted therein an air turbine 15, and an induction fan 16, actuated by said air expander 15 through a speed reducer 17. Compressed air for use in the cooling system is provided by a compressor 20 which is preferably of the axial flow type actuated by a motor 26. The compressor may be disposed in an isolated location. An axial flow compressor is considered desirable for this system because at present it is the only type compressor which does not entrain oil particles in the compressed air.

The compressed air for the use in this cooling system may be supplied by a compressed air service line with which the building or electronic room may be equipped for other purposes, provided it has sufficient capacity, in which case a separate air compressor for this system may not be required.

A compressed air pipe line 21 from the compressor 20 is connected to an air valve 22 which is operatively connected to a thermostat 23, which is positioned within the electronic equipment cabinet. Depending upon the temperature in the cabinet, the thermostat 23, if the temperature is too high, opens the air valve 22 so that compressed air passes through the pipe lines 24 to the air expander 15. The air turbine 15 consists of a turbine type rotor 27 mounted on a shaft 28 and having an inlet nozzle 29 and an exhaust outlet 30. The rotor 27 revolves in the housing 31 which is provided with an efficient heat insulating covering 32 such as glass wool or bonded magnesia insulation. The exhaust outlet 30 is connected to a diffuser 34 which delivers the expanded air upwardly into the induced air stream above the air expander 15, the air stream being moved by the induction fan 16 which is mounted on the vertical shaft 36, integral with or coupled to the shaft of the speed reducer 17. The speed reducer 17 is mounted over the air expander on brackets 38 which extend upwardly from the housing 31 of the air expander 15. The shaft 28 of the air expander 15 is operatively connected to the speed reducer 17 so that when the air expander is rotating, preferably at speeds from 4000 to 8000 r.p.m., the induction fan 16 operates at a low speed of about 1200 to 1800 r.p.m.

When the temperature in the cabinet has been lowered by the use of compressed air as above described, the thermostat in the cabinet actuates a pressure switch 39 which stops the compressor 20 and simultaneously opens another pressure switch 40 which sets in operation the exhaust fan 41 which is disposed on the top of the cabinet 11 over an exhaust opening 42, so that room air is sucked into the cabinet through openings 33 in the sides and base of the air cooler housing 14 below the cabinet, entering the cabinet through the bottom openings 19 therein. When the temperature at the thermostat has again become too high, the reverse control actions are started, that is, the axial compressor 20 is again actuated, the exhaust fan 41 is disconnected, and the cooling cycle starts by the adiabatic expansion of the compressed air in the air expander 15.

Electronc equipment operates best under humidity conditions of about 50 percent relative humidity, and therefore under dry climatic conditions, it is desirable to have automatic humidifying means in conjunction with the intake to the compressed air system and optional drying means in the compressed air line. This is shown schematically in FIG. 4. A humidity controller 45 pneumatically actuates a water valve 46 which admits water to an ambient air humidifier 47. The ambient air for the compressor enters the air inlet port 48 of the humidifier 47 where it is mixed with water vapor and passes into the compressor 20.

Under some other conditions the ambient air or the humidified compressed air may contain too much moisture, and therefore a compressed air drier 50 (for example a "Sta-dri" filter) is provided, a by-pass valve 51 controlled pneumatically by said humidity controller 45 being also provided to provide for drying the compressed air to the desired humidity, before it goes to the air turbine 15 through the pipe line 24.

The operation of my air cooling system for electronic and electrical equipment cabinets will be understood from the above description of the equipment and its operation. For example, the temperaature of the air from the air turbine 15 is about 30° F. when the air from the compressor 20 is at a pressure of about 21 pounds per square inch (absolute), which provides ample cooling to the desired operating temperature in the cabinet.

It will be understood that if a service line of compressed air is available and is utilized instead of a separate compressor, then the pressure switch 40 will actuate a valve disposed in the compressed air service line, which is opened and closed by the action of the pressure switch.

The objectives stated in the beginning have been attained.

I claim:
1. An air cooling apparatus for electronic and electrical equipment comprising a cabinet enclosing said equipment and having opposed first and second air vent openings for circulating air through said cabinet; a mixing chamber disposed adjacent said cabinet communicating with said first vent opening in said cabinet and having inlet openings communicating with the ambient air; means for removing air through said second air vent opening in said cabinet; a motor-actuated air compressor for compressing ambient air; an air turbine communicating with said compressor and actuated by the adiabatically expanding compressed air therefrom; and an impeller fan for circulating a mixture of ambient air and the cooled expanded compressed air discharged from said air turbine, said impeller fan being disposed in said mixing chamber adjacent said first vent opening, said impeller fan being driven by said air turbine.

2. The air cooling apparatus defined in claim 1 in which the casing for the air turbine is thermally insulated.

3. An air cooling apparatus for electronic and electrical equipment comprising a cabinet enclosing said equipment having opposed first and second air vent openings for circulating air through said cabinet; a mixing chamber disposed adjacent said cabinet communicating with said first vent opening in said cabinet and having inlet openings communicating with the ambient air; a motor-actuated suction fan communicating with said second air vent opening in said cabinet; a motor-actuated air compressor for compressing ambient air; an air turbine communicating with said compressor and actuated by expanding compressed air therefrom; an impeller fan for circulating to said cabinet a mixture of ambient air and the cooled expanded compressed air discharged from said air turbine, said impeller fan being disposed in said mixing chamber adjacent said first vent opening, said impeller fan being driven by said air turbine; and thermostat-controlled switch means for alternatively switching on the said motor-actuated air compressor or said motor actuated suction fan in response to the temperature in said cabinet.

4. An air cooling apparatus for electronic and electrical equipment comprising a cabinet enclosing said equipment having air vent openings at the top and bottom thereof; a mixing chamber disposed below said cabinet communicating with said bottom opening and having inlet openings communicating with the ambient air; a motor-actuated suction fan disposed above said cabinet and communicating with said top opening; a motor-actuated air compressor for compressing ambient air; an air turbine communicating with said compressor and actuated by expanding compressed air therefrom, said air turbine being thermally insulated; an impeller fan actuated through a speed reducer by said air turbine, said impeller fan circulating a mixture of ambient air from said inlet opening in said mixing chamber and the cooled expanded air from said air turbine to the bottom vent opening of said cabinet; and thermostat-controlled switch means for alternatively switching on the said motor-actuated air compressor or said motor-actuated suction fan in response to the temperature in said cabinet.

5. The air cooling apparatus defined in claim 4 in which the mixing chamber including the impeller fan and the air turbine are mounted on the undersidee of a mobile platform upon which said cabinet is supported.

6. The air cooling apparatus defined in claim 4 in which the ambient air to said compressor is humidity-conditioned by passage alternatively through an ambient air humidifier or a compressed air drier, in response to a humidity controller disposed inside said housing, and activating valve means to said humidifier and said drier.

References Cited in the file of this patent

UNITED STATES PATENTS

| | | |
|---|---|---|
| 2,038,347 | Cornell | Apr. 21, 1936 |
| 2,304,151 | Crawford | Dec. 8, 1942 |
| 2,928,261 | Sampetro | Mar. 15, 1960 |